(12) United States Patent
Brennan et al.

(10) Patent No.: US 11,668,896 B2
(45) Date of Patent: Jun. 6, 2023

(54) MOUNT PAD

(71) Applicant: Eagle Technology, LLC, Melbourne, FL (US)

(72) Inventors: Sean A. Brennan, Pittsford, NY (US); Matthew John East, Fairport, NY (US)

(73) Assignee: EAGLE TECHNOLOGY, INC., Melbourne, FL (US)

( * ) Notice: Subject to any disclaimer, the term of this patent is extended or adjusted under 35 U.S.C. 154(b) by 198 days.

(21) Appl. No.: 17/198,699

(22) Filed: Mar. 11, 2021

(65) Prior Publication Data

US 2022/0291480 A1  Sep. 15, 2022

(51) Int. Cl.
*G02B 7/182* (2021.01)

(52) U.S. Cl.
CPC .................................... *G02B 7/182* (2013.01)

(58) Field of Classification Search
None
See application file for complete search history.

(56) References Cited

U.S. PATENT DOCUMENTS

| | | |
|---|---|---|
| 4,763,991 A | 8/1988 | Klotz, Jr. |
| 4,973,145 A * | 11/1990 | Kirkwood ............... F16C 11/12 359/223.1 |
| 5,550,669 A | 8/1996 | Patel |
| 5,801,891 A | 9/1998 | Lloyd |
| 6,552,862 B2 | 4/2003 | Dieker |
| 9,958,638 B2 | 5/2018 | Naepflin et al. |
| 10,658,262 B2 | 5/2020 | Ho |
| 2015/0077874 A1 * | 3/2015 | Naepflin ................. G02B 7/183 359/872 |
| 2019/0219130 A1 * | 7/2019 | Jia ........................... F16F 7/104 |
| 2020/0280154 A1 | 9/2020 | Ho |

FOREIGN PATENT DOCUMENTS

| | | | | |
|---|---|---|---|---|
| EP | 2206934 A1 * | 7/2010 | .......... | F16F 15/1215 |
| EP | 3388710 A1 * | 10/2018 | ............. | B21D 39/02 |

* cited by examiner

*Primary Examiner* — Steven M Marsh
(74) *Attorney, Agent, or Firm* — Edell, Shapiro & Finnan, LLC

(57) ABSTRACT

According to one implementation a mount pad is provided that includes a plurality of arcuate flexure members disposed between and connected to top and bottom plates. According to some implementations a majority or all of the arcuate flexure members have a semi-circular cross-section and are arranged to form a plurality of radially spaced-apart concentric rings. Concave surfaces of the arcuate flexure members face radially inward toward a center of the concentric rings. Circumferential adjacent arcuate flexure members in each of the concentric rings are circumferentially spaced apart from one another so that a gap exists between them. According to some implementations the mount pad further includes a coupling unit prolonging from one of the top and bottom plates, the coupling unit facilitating a connection of the mount pad to a support structure. According to some implementations the mount pad is a monolithic structure. According to some implementations the monolithic structure is made using an additive manufacturing method.

20 Claims, 10 Drawing Sheets

MOUNT PAD

This invention was made with government support under contract no. 80SFC20C0018 awarded by the National Aeronautics and Space Administration. The government has certain rights in the invention.

TECHNICAL FIELD

The present invention relates to mounting pads used for joining components.

BACKGROUND

Joining components having different coefficients of thermal expansion is especially problematic when one of the components is highly susceptible to strain induced by the mismatching coefficients of thermal expansion. For example, in the field of optics mirrors are used to transmit light in a very precise way. When a mirror is subjected to particular types of strain, like those brought about by a mismatch of the coefficient of thermal expansion of the mirror and the coefficient of thermal expansion of a structure that supports it, the mirror has the possibility of deforming. Strain can also occur as a result of assembly misalignment between the mirror and the structure that supports it, and also by torque or force applied to the mirror during its attachment to the supporting structure. Conventionally, mount pads attached to the mirror are used to couple the mirror to the supporting structure. Often, the mount pads are bonded to the mirror with adhesives and shrinkage of the adhesive occurs during the adhesive curing process. This shrinkage can also deform the mirror. As is readily evident, these deformations and other dimensional changes can adversely affect the mirror's performance and also that of the optical system in which the mirror functions. These issues also arise in the use of other types of optical devices and other types of components whose functionality is greatly affected by externally applied stresses and strains.

SUMMARY

A mound pad for structurally coupling a first component (e.g. mirror) to second component (e.g. a supporting structure) is provided. According to one implementation, the mount pad includes a base plate, a top plate and a plurality of arcuate flexure members disposed between the base plate and top plate. Each of the plurality of arcuate flexure members includes a first end coupled to an inner side of the base plate and a second end coupled to an inner side of the top plate. The base plate includes an outer side that may be configured for direct attachment to the first component by use of, for example, an adhesive. The plurality of arcuate flexure members are arranged to form a plurality of radially spaced-apart concentric rings, each of the plurality of arcuate flexure members comprising a concave surface defined by an arcuate surface, the concave surface facing a center of the plurality of radially spaced-apart concentric rings. In each of the concentric rings, the arcuate flexure members are circumferentially spaced-apart from one another so that a gap exists between pairs of circumferentially adjacent arcuate flexure members. According to some implementations, in each of the concentric rings the arcuate flexure members are spaced equidistantly about the circumference of the ring. According to some implementations the base plate, top plate and plurality of arcuate flexure members comprise a monolithic structure and is made of a material having a low coefficient of thermal expansion. According to one implementation, the monolithic structure is produced using an additive manufacturing process, such as a three-dimensional printing process. The material used to construct the mount pad, may be, for example, the iron-nickel alloy commonly known as Invar 36® Alloy. Other metal alloys, such as titanium alloys, may also be used.

According to some implementations the base plate and top plate are arranged parallel to one another. According to some implementations the arcuate flexure members are arranged substantially perpendicular to each of the base plate and top plate. The arcuate flexure elements preferably have a semi-circular cross-section with the flexure elements in any given concentric ring having the same radius of curvature.

According to some implementations the mount pad includes a coupling unit prolonging from the top plate. The coupling unit includes one or more features for coupling the mount pad to the supporting structure. As will be discussed in more detail below, according to some implementations the mount pad can be coupled to a supporting structure by elongate struts having one end attached to the coupling unit of the mount pad and a second end coupled to the supporting structure. The one or more features of the coupling unit may comprise one or more apertures for receiving the ends of one or more elongate struts. According to some implementations the base plate, top plate, coupling unit and plurality of arcuate flexure members comprise a monolithic structure and is made of a material having a low coefficient of thermal expansion like those discussed above. According to some implementations the monolithic structure is devoid of any cuts. That is, the arcuate flexure members are constructed without the cutting of any material.

The arcuate flexure members are mechanical components that are more compliant in the radial direction and less compliant in the circumferential direction. In particular, the arcuate flexure members are arranged in a three dimensional cylindrical coordinate system that includes an axis (e.g. z-axis), a radial component (r) designating a radial distance from the axis, and an angular component designating an angular position within a circular plane arranged centered and perpendicular with respect to the axis. The arcuate flexure members exhibit compliance in the radial direction and are more stiff in the other directions. According to some implementations, the arcuate flexure members are arranged with respect to one another such that the flexure members act together to provide the mount pad with a relatively uniform stiffness in all radial directions (stiffness varies by no more than 25% between any of the radial directions). By virtue of their ability to flex, the arcuate flexure members are able to absorb stresses caused by differences in coefficients of thermal expansion and other stresses as discussed above. In essence, the arcuate flexure members provide a partial disconnection between the supporting structure and the optical component, absorbing dimensional changes that occur in the supporting structure so that they are not transmitted, or are transmitted to a lesser degree, to the optical component. The radial uniform stiffness characteristic of the mount pad allows it to be affixed to the optical component in any angular position without substantially changing its stress relief capability. The mount pad further allows a more exact positioning control of the optical component while mitigating moments and distortions. The generally cylindrical symmetric arrangement of the flexure members provides a more uniform expansion and stress distribution that permits the mount pad to better absorb stresses imposed on it.

These and other advantages and features will become apparent in view of the figures and the detailed description.

It is important to note that the mount pads disclosed and contemplated herein are not limited to optical applications, but may be used in the interconnecting of any of a host of other devices/structures.

DETAILED DESCRIPTION

The disclosure that follows relates to the use of mount pads that comprise arcuate flexure members used in the interconnection of components. In the examples that follow, the mount pads are explained with respect to being used as an interconnect in an optical system. As noted above, the use of the mount pads are in no way limited to such systems.

Figure 1:
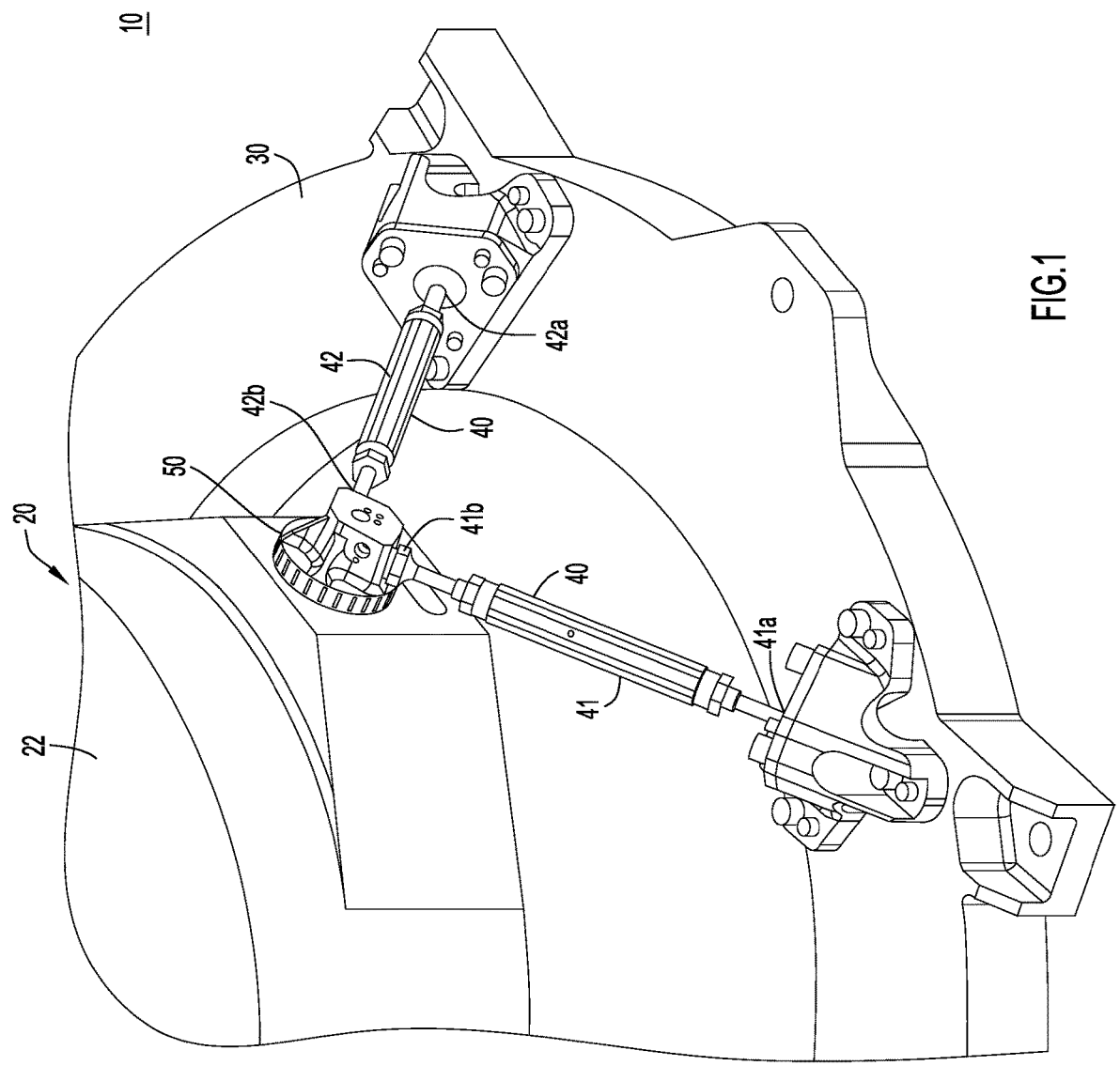
FIG. 1 is a partial perspective view of an optical assembly that includes a mount pad comprising arcuate flexure members disposed between an optical component and a supporting structure.

FIG. 1 illustrates an optical system 10 in which a mirror assembly 20 comprising an optical mirror 22 is coupled to a supporting structure 30 with an intermediary mount pad 50 disposed between them. The coupling is facilitated through the use of a number of strut assemblies, such as bi-pod strut assemblies 40 as shown in FIG. 1. In the example of FIG. 1, each of the bi-pod assemblies 40 includes first and second struts 41 and 42 that each have a first end 41a and 41b respectively coupled to first and second locations on the supporting structure 30. Each of the first and second struts also includes a second end 41b and 42b that are coupled to the mount pad 50. The optical system 10 may be, for example, integrated into an optical telescope.

Figure 2:
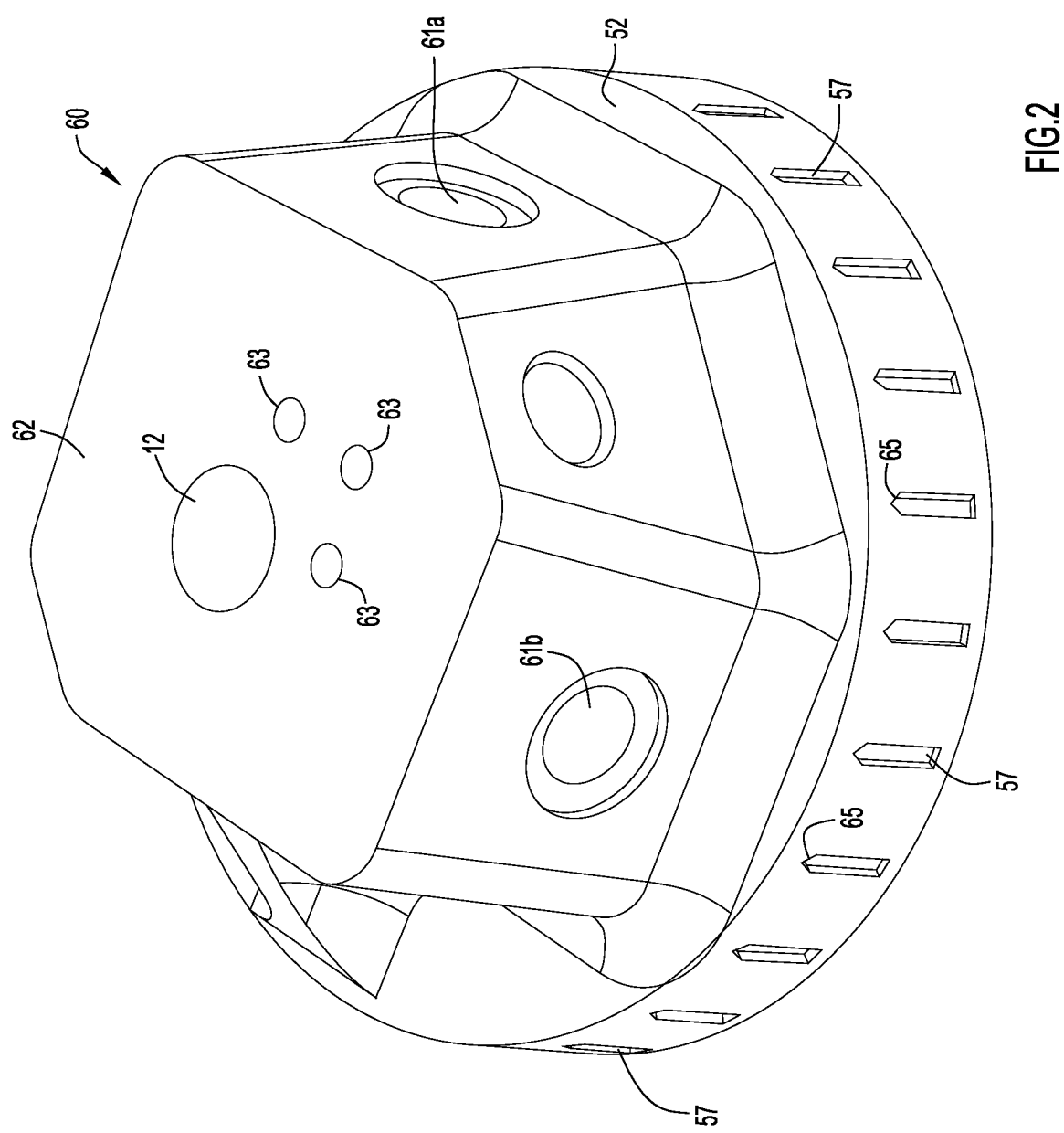
FIG. 2 is a perspective view of a mount pad according to one implementation.
Figure 3:
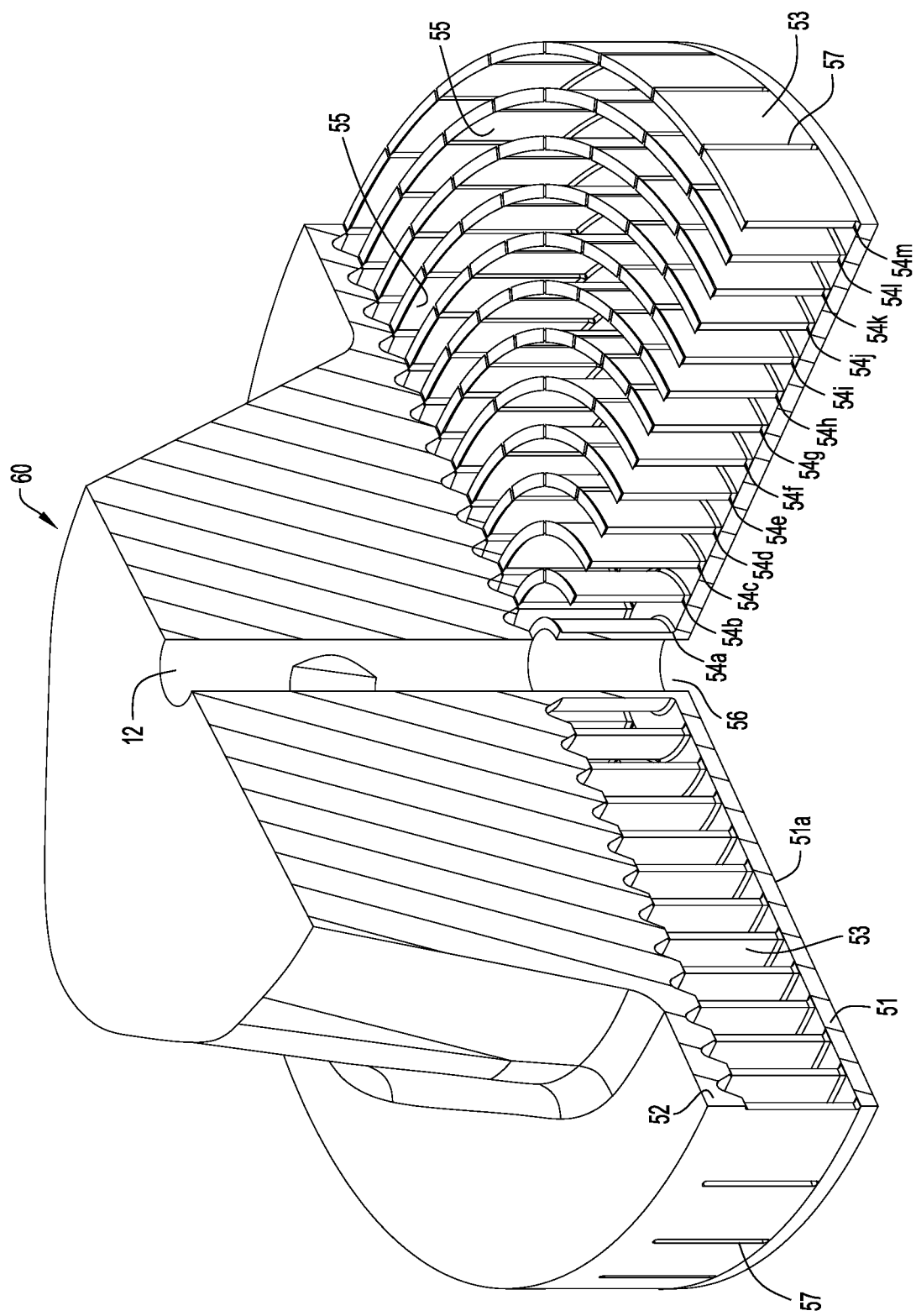
FIG. 3 is a partial cut-away view of the mount pad of FIG. 2.

According to one implementation, as shown in FIGS. 2 and 3, the mount pad 50 includes a base plate 51 and a top plate 52 that are spaced apart from one another. Extending between and coupled to the base plate 51 and top plate 52 are a plurality of arcuate flexure members 53 that are arranged to form a plurality of radially spaced-apart concentric rings 54a-m. Each of the arcuate flexure members 53 comprises a concave surface 55 that faces towards the center 56 of the concentric rings. In each of the concentric rings 54a-m the arcuate flexure members 53 are circumferentially spaced apart from one another so that a gap 57 exists between circumferentially adjacent flexure members. According to some implementations, the flexure members 53 in any of the concentric rings occupy between 70% to 95% of the total circumference of the ring. According to some implementations, the flexure members 53 in at least some or all of the concentric rings are circumferentially spaced equidistantly apart.

According to some implementations, a radial alignment exists between at least some of the gaps 57 situated in radially adjacent concentric rings 54. According to other implementations none of the gaps 57 in radially adjacent concentric rings 54 are radially aligned.

According to some implementations, the base plate 51 and top plate 52 are arranged parallel to one another with the flexure members being oriented perpendicular to each of the top and bottom plates. Other configurations are also contemplated. In the figures, the top and bottom plates are shown to be flat surfaces. However, according to other implementations, the top and bottom plates may be curved. In such implementations, the top and bottom plates may be arranged parallel to one another with the flexure members being oriented perpendicular to each of the curved top and bottom plates.

In the example mount pads shown in the figures, a bottom 51a of the base plate 51 is configured to be attached to the mirror assembly 20, and the top plate 52 has prolonging from it a coupling unit 60 containing features for connecting the strut ends 41b and 42b to the mount pad. In the example shown in FIG. 2, the coupling unit 60 includes apertures 61a and 61b that are respectively configured to receive the strut ends 41b and 42b. The coupling unit 60 may also include one or more holes 63 opening to the top 62 that are useable to align the mount pad during its installation.

According to one implementation, the base plate 51 of the mount pad 50 is configured to be attached to the mirror assembly 20 by use of an adhesive. To facilitate such an attachment, the mount pad 50 includes a through hole 12 through which an adhesive may be introduced, the through hole extending between and through the top 62 of the coupling unit 60 and the base plate 51, the through hole extending through the inner-most concentric ring 54a.

According to some implementations the base plate 51, top plate 52 and flexure members 53 are a monolithic structure. According to one such implementation, the base plate, top plate and flexure members are made using an additive manufacturing process (e.g. using a three-dimensional printing process). In instances where the mount pad 50 also includes the coupling unit 60, according to some implementations the base plate 51, top plate 52, flexure members 53 and coupling unit are a monolithic structure. According to one such implementation, the base plate, top plate, flexure members and coupling unit are made using an additive manufacturing process (e.g. using a three-dimensional printing process). The material used to construct the mount pad, may be, for example, the iron-nickel alloy commonly known as Invar 36® Alloy. Other metal alloys such as titanium alloys, may also be used.

According to some implementations a vast majority (at least 75%) of the arcuate flexure members 53 have a semi-circular cross-section with such flexure members in any given concentric ring 54a-m having the same radius of curvature. According to other implementations all or substantially all (at least 90%) of the arcuate flexure members 53 have a semi-circular cross-section with such flexure members in any given concentric ring 54a-m having the same radius of curvature. In the examples illustrated in the figures, all of the flexure members 53 have a semi-circular cross-section.

The number of concentric rings will vary depending on the particular application. In the example of FIG. 3 there exists thirteen concentric rings, in the example of FIGS. 4 and 5 there exists 7 concentric rings, and in the example of FIG. 8 there exists twelve concentric rings. According to some implementations the mount pad 50 includes no less than five concentric rings, whereas according to other implementations the mount pad includes no less than three concentric rings.

Figure 5:
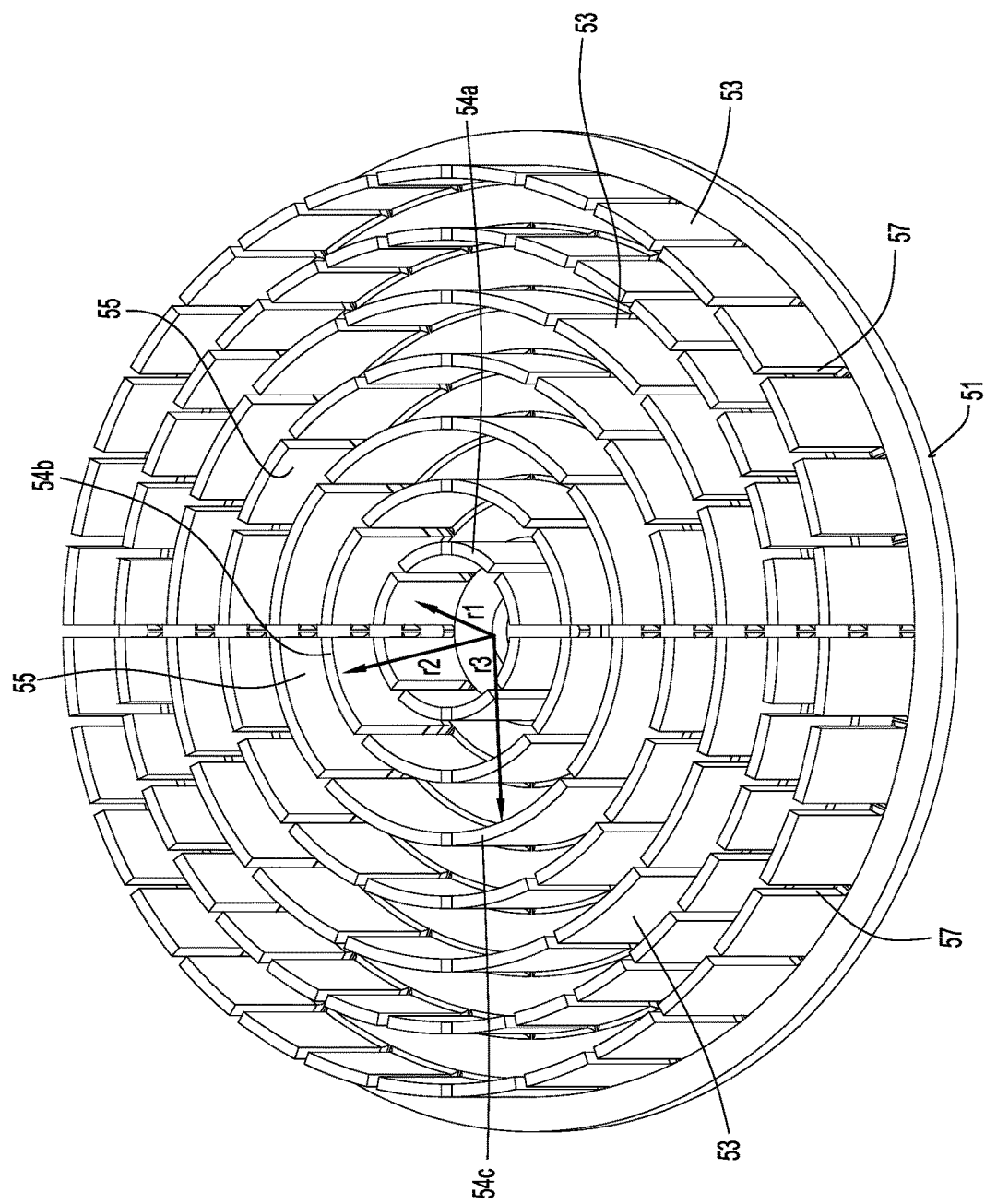
FIG. 5 is a top perspective view of the mount pad of FIG. 4 with the top plate removed.

With reference to FIG. 5, the plurality of concentric rings includes a first set of semi-circular flexure members circumferentially spaced-apart from one another to form a first ring 54a having a first radius of curvature r1, a second set of semi-circular flexure members circumferentially spaced-apart from one another to form a second ring 54b having a second radius of curvature r2, the second ring 54b surrounding the first ring 54a, and a third set of semi-circular flexure members circumferentially spaced-apart from one another to form a third ring 54c having a third radius of curvature r3, the third ring 54c surrounding the second ring 54b, the second radius of curvature r2 being greater than the first radius of curvature r1 and the third radius of curvature r3 being greater than the second radius of curvature r2. According to some implementations each of the flexure members 53 in the first ring 54a are of the same shape and size, each of the flexure members 53 in the second ring 54b are of the same shape and size, and each of the flexure members 53 in the third ring 54c are of the same shape and size. According to other implementations the size and/or shape of the flexure members may vary in any given concentric ring.

Figure 4:
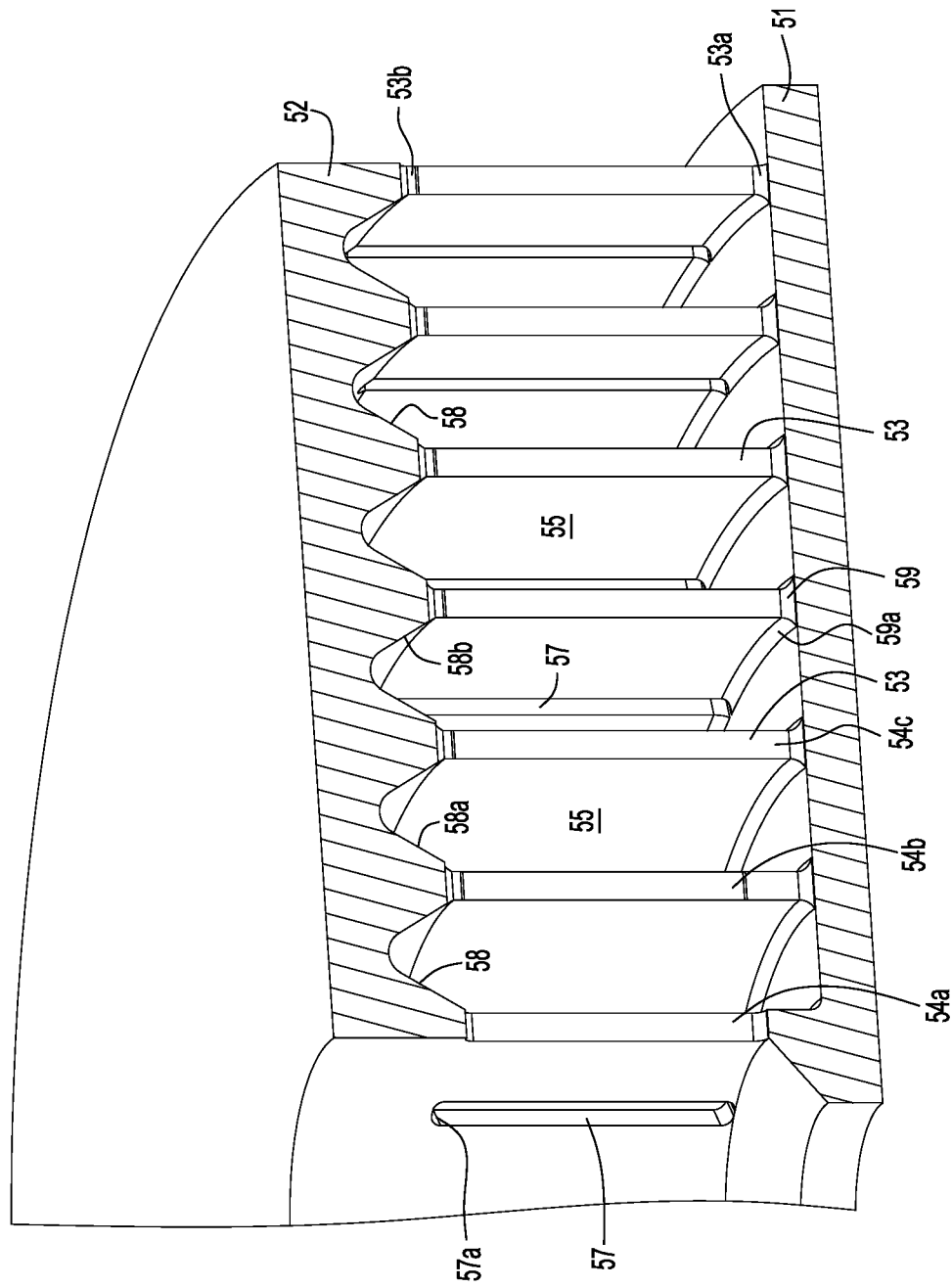
FIG. 4 is a partial cut-away view of a mount pad having seven concentric rings and showing a means by which the ends of the arcuate flexure members are coupled with the bottom and top plates of a mount pad.
Figure 7:
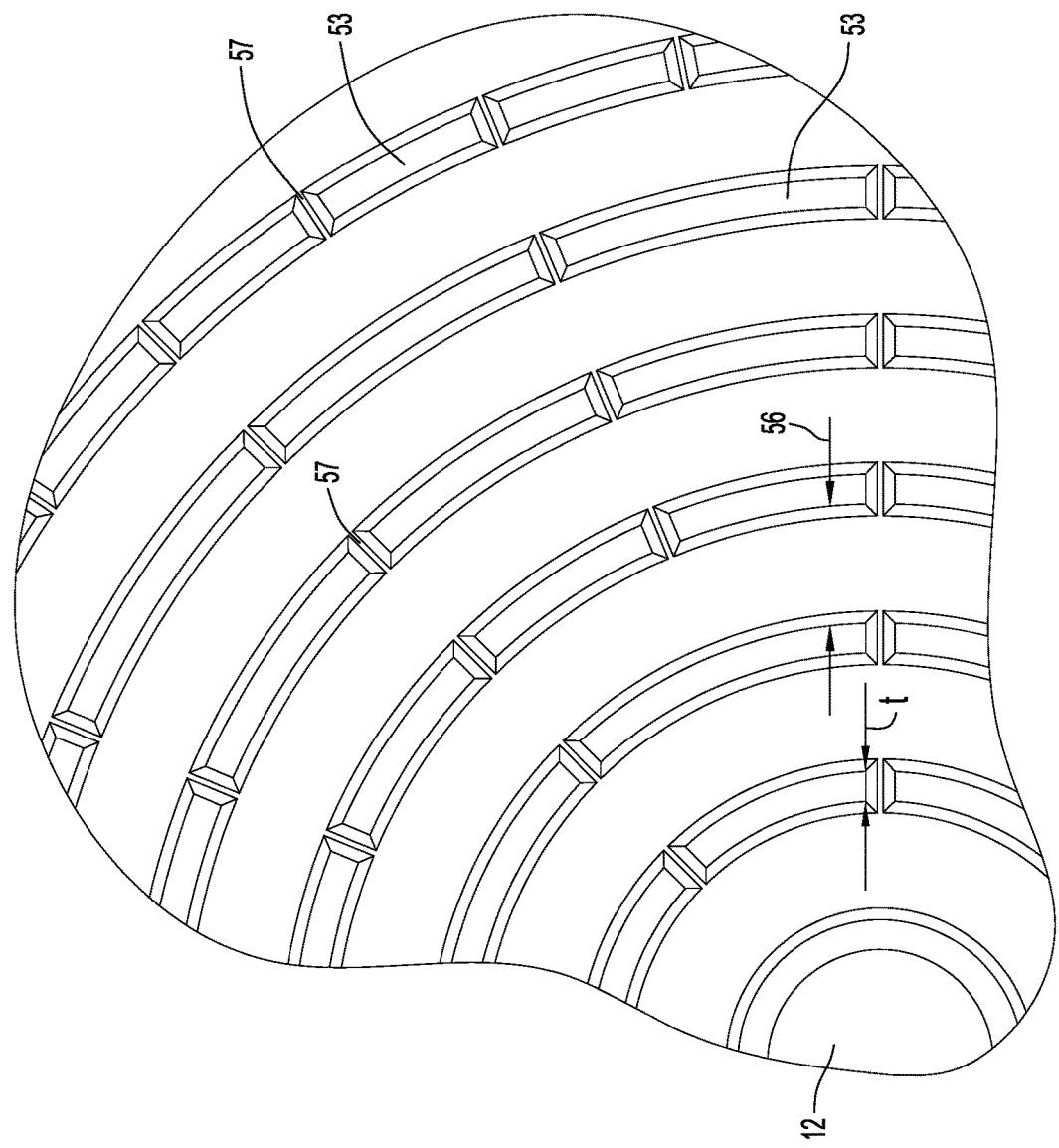
FIG. 7 is a cut-away top view of an arrangement of arcuate flexure members arranged in concentric rings.

As best shown in FIG. 4, according to some implementations the first end 53a of each of the flexure members 53 is coupled to the base plate 51 by a pedestal 59 having rounded sides 59a. This coupling arrangement provides a more secure attachment of the flexure members 53 to the base plate 51. Moreover, the rounded sides 59a of the pedestals 59 minimize stress concentrations at the coupling juncture With reference to FIGS. 3 and 4, according to some implementations the second ends 53b of the flexure members 53 of radially adjacent concentric rings are connected by arches 58 formed as a part of the top plate 52. The arches 58 provide additional stress relief in the mount pad 50 and obviate the need of using a support device when an additive manufacture process is utilized to construct the mount pad. According to some implementations the ascending and descending portions of the arch 58a and 58b are positioned at an angle α (see FIG. 7) having a value of at least 60 degrees as measured from a line connecting the second ends 53b of radially adjacent flexure members.

In a similar manner, the second ends 53b of circumferentially adjacent flexure members 53 in each of the concentric rings 54 are also connected by arches 65 (see FIG. 2) that provide additional stress relief in the mount pad 50 and obviate the need of using a support material when an additive manufacture process is utilized to construct the mount pad. As shown in FIG. 4, according to some implementations the arches 65 result in the gaps 57 that circumferentially separate the flexure members to comprise a rounded end 57a. As shown in FIG. 4, according to some implementations both ends of the gaps 57 are rounded.

Figure 6:
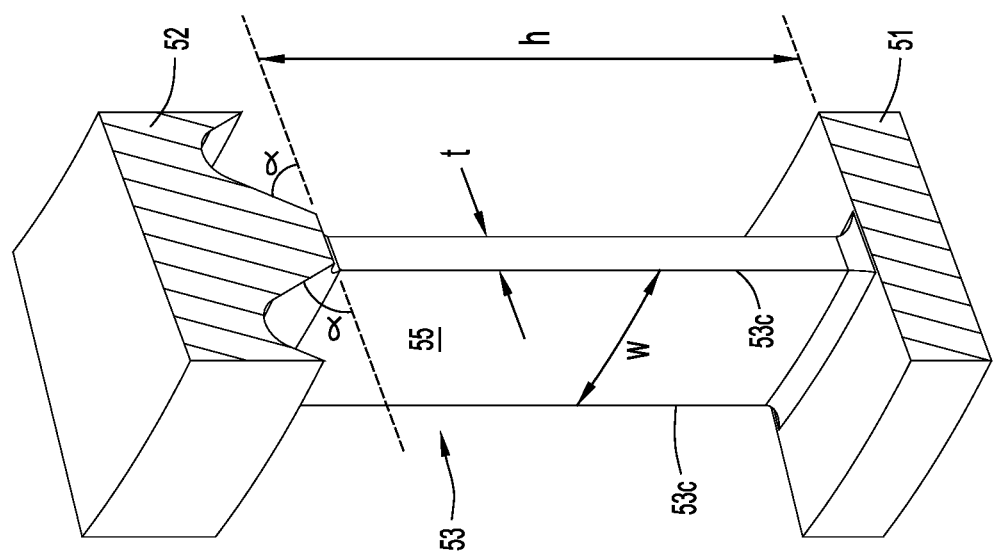
FIG. 6 is a perspective view of an arcuate flexure member according to one implementation.

As shown in FIG. 6, each flexure member 53 includes a height "h", a width "w" and a thickness "t". The width is measured as a straight line between the circumferential ends 53c of the concave surface 55, According to some implementations the flexure members 53 are made of the Invar 36® Alloy with the flexure members 33 having a height to thickness ratio (h/t) of between 7 to 1 and 50 to 1.

According to one example, the mount pad 50 comprises a circular shape with the diameter of the base plate 51 being about 2.0 inches and a distance between the bottom surface of the base plate 51 and the top surface of the top plate 52 being about 0.5 inches. The thickness of each the base plate 51 and top plate 52 being between 0.050 to 0.055 inches The width of the flexure members 53 in different concentric rings 54 will typically vary, and in one implementation the flexure members 53 have a thickness of about 0.025 inches and a height of about 0.325 inches. According to one implementation the flexure members 53 are arranged in the mount pad such that the circumferential gap 57 has a width of about 0.025 inches and the radial gap 56 (see FIG. 7) separating the concentric rings 54 is about 0.1 inches. Hence, according to one implementation, the ratio of the radial gap dimension 56 to the thickness dimension t of the flexure members is about 4 to 1.

Figure 8:
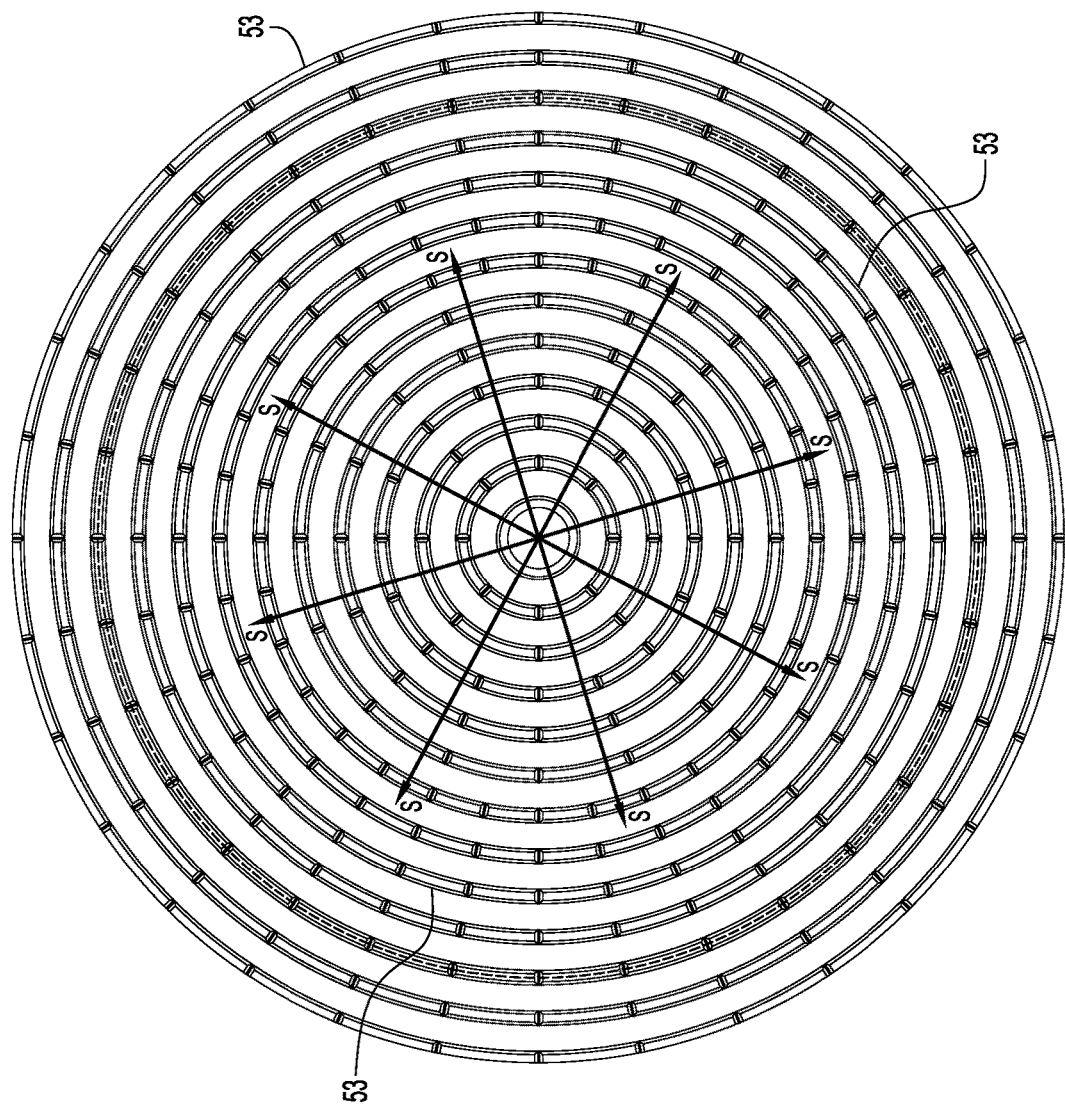
FIG. 8 is a top view representation of arcuate flexure members being arranged to form a plurality of concentric rings, illustrating its ability to absorb stresses in substantially the same way in substantially all radial directions.

As discussed above, the arcuate flexure members 53 are mechanical components that are more compliant in the radial direction and less compliant in the circumferential direction. That is, the arcuate flexure members 53 exhibit compliance in the radial direction and are more stiff in the other directions. According to some implementations, and as shown in FIG. 8, the arcuate flexure members are arranged with respect to one another such that the flexure members act together to provide the mount pad with a relatively uniform stiffness S in all radial directions (stiffness varies by no more than 25% between any of the radial directions). By virtue of their ability to flex, the arcuate flexure members are able to absorb stresses caused by differences in coefficients of thermal expansion and other stresses as discussed above. In essence, the arcuate flexure members 53 provide a partial disconnection between the supporting structure 30 and the mirror assembly 20, absorbing dimensional changes that occur in the supporting structure 40 so that they are not transmitted or are transmitted to a lesser degree to the mirror assembly 20. The radial uniform stiffness characteristic of the mount pad 50 allows it to be affixed to the mirror assembly 20 in any angular position without substantially changing its stress relief capability. The mount pad 50 further allows a more exact positioning control of the optical component while mitigating moments and distortions. The generally cylindrical symmetric arrangement of the flexure members 53 provides a more uniform expansion and stress distribution that permits the mount pad 50 to better absorb stresses transmitted to it by the supporting structure 30 via strut assembly 40.

Figure 9:
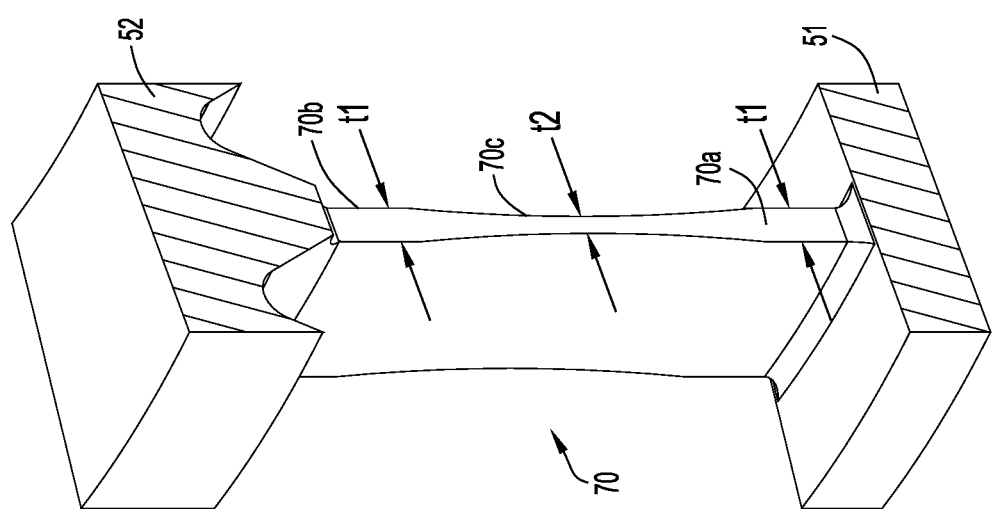
FIG. 9 is a perspective view of an arcuate flexure member according to another implementation.

FIG. 9 is a perspective view of an arcuate flexure member 70 according to another implementation wherein the thickness profile of the flexure member comprises an hour glass shape. That is, the end portions 70a and 70b of the flexure member each has a thickness t1 that is greater than a thickness t2 of a central portion 70c of the flexure member. In the implementation of FIG. 9 the end portions 70a and 70b have a same thickness. However, according to other implementations the end portions 70a and 70b have different thicknesses that are each greater than the thickness of the central portion 70c. According to some implementations, at least the radially outermost ring of flexure members include one of the aforementioned variable thickness profiles. For example, in a variant to the implementation of FIG. 3, concentric ring 54m would comprises flexure members having one of the aforementioned variable thickness profiles.

Figure 10:
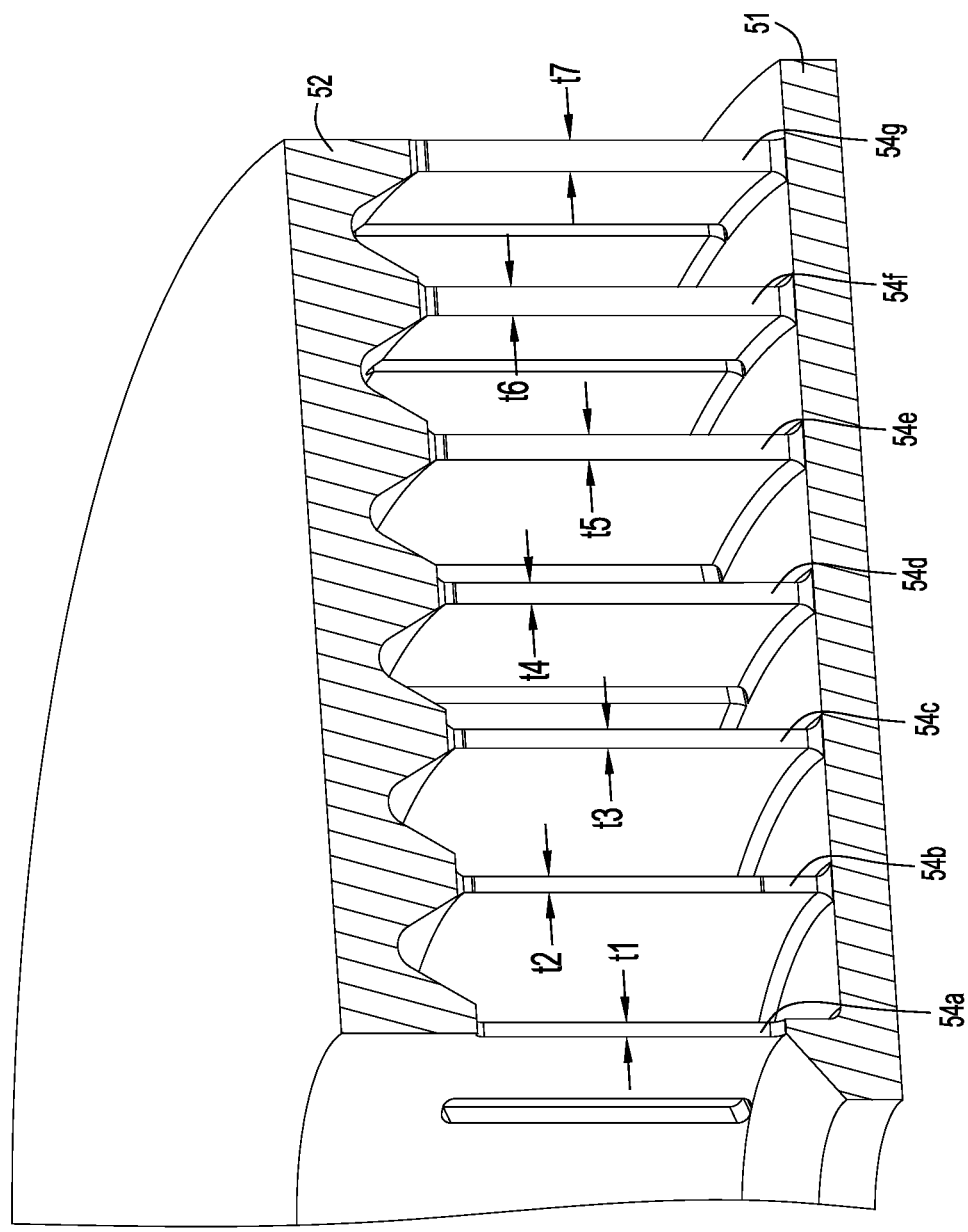
FIG. 10 is a partial cut-away view of a mount pad wherein the flexure members located in different concentric rings possess different thicknesses.

As shown in FIG. 10, according to some implementations the flexure members 53 of the center-most concentric ring 54a have a thickness t1 that is greater than at least the thickness t7 of the flexure members in the outer-most ring 54g so that the flexure members in the inner-most concentric ring exhibit a greater radial stiffness than that of the flexure members in the outer-most concentric ring 54g. According to some implementations, the thickness of the flexure members in one or more of concentric rings 54b-54f are less than thickness t1 and greater than thickness t7. That is, at least one of thicknesses t2-t6 is less than thickness t1 and greater than thickness t7. According to some implementations thickness t2 is less than thickness t1, thickness t3 is less than thickness t2, thickness t4 is less than thickness t3, thickness t5 is less than thickness t4 and thickness t6 is less than thickness t5.

The foregoing discussion has been presented for purposes of illustration and description. It is understood that the implementations disclosed herein are non-limiting examples. Consequently, variations and modifications commensurate with the above teachings, within the skill or knowledge of the relevant art, are within the scope of the present invention.

What is claimed is:

1. A mound pad for structurally coupling a first component to second component, the first component being supported by the second component, the mount pad comprising:
    a base plate configured to be coupled to the first component;
    a top plate spaced a distance apart from the base plate; and
    a plurality of arcuate flexure members each having a first end and a second end opposite the first end, the first ends being attached to the base plate, the second ends being attached to the top plate, the plurality of arcuate flexure members being arranged to form a plurality of radially spaced-apart concentric rings, each of the plurality of arcuate flexure members comprising a concave surface that faces a center of the plurality of radially spaced-apart concentric rings, the arcuate flexure members in each of the plurality of concentric rings being circumferentially spaced-apart from one another so that a gap exists between each of the circumferentially adjacent arcuate flexure members.

2. The mount pad according to claim 1, wherein a majority of the arcuate flexure members have a semi-circular cross-section with the arcuate flexure members in any given concentric ring having the same radius of curvature.

3. The mount pad according to claim 1, wherein all of the plurality of arcuate flexure members have a semi-circular cross-section with the arcuate flexure members in any given concentric ring having the same radius of curvature.

4. The mount pad according to claim 1, wherein the base plate, the top plate and the plurality of arcuate flexure members comprise a monolithic structure.

5. The mount pad according to claim 1, wherein the mount pad includes a coupling unit prolonging from the top plate, the coupling unit including one or more apertures configure to respectively receive an end of one or more struts.

6. The mount pad according to claim 5, wherein the base plate, the top plate, the coupling unit and the plurality of arcuate flexure members comprise a monolithic structure.

7. The mount pad according to claim 1, wherein the base plate and top plate are arranged parallel to one another.

8. The mount plate according to claim 7, wherein the plurality of arcuate flexure members are arranged perpendicular to each of the base plate and top plate.

9. The mount pad according to claim 1, wherein the plurality of concentric rings includes a first set of arcuate flexure members circumferentially spaced-apart from one another to form a first ring having a first radius of curvature, a second set of arcuate flexure members circumferentially spaced-apart from one another to form a second ring having a second radius of curvature, the second ring surrounding the first ring, and a third set of arcuate flexure members circumferentially spaced-apart from one another to form a third ring having a third radius of curvature, the third ring surrounding the second ring, the second radius of curvature being greater than the first radius of curvature and the third radius of curvature being greater than the second radius of curvature.

10. The mount pad according to claim 1, wherein the first ends of the arcuate flexure members of radially adjacent concentric rings are connected by a first set of arches formed in the top plate.

11. The mount pad according to claim 1, wherein the circumferentially adjacent arcuate flexure members in each of the plurality of concentric rings are connected by a second set of arches formed in the top plate, each of the second set of arches extending across the gap existing between each of the circumferentially adjacent arcuate flexure members.

12. The mount pad according to claim 9, further comprising a through hole extending between and through the top and bottom plates, the through hole extending through the first ring.

13. The mount pad according to claim 9, wherein each of the arcuate flexure members in the first ring are of the same shape and size, each of the arcuate flexure members in the second ring are of the same shape and size, and each of the arcuate flexure members in the third ring are of the same shape and size.

14. The mount pad according to claim 9, wherein at least some of the gaps of the first ring are radially aligned with some of the gaps of the second ring and/or some of the gaps of the third ring.

15. The mount pad according to claim 9, wherein the arcuate flexure members of the first, second and third rings respectively occupy 70% to 95% of a circumference of the first, second and third rings.

16. The mount pad according to claim 9, wherein the first ring includes a first arcuate flexure member and the second ring includes a second arcuate flexure member that are radially aligned with one another with a radial gap existing between them, each of the first and second arcuate flexure members having a width and a thickness, a width/thickness ratio of the radial gap between greater than 2.

17. The mount pad according to claim 1, wherein each of the plurality of arcuate flexure members have a height and a width, at least some of the plurality of arcuate flexure members having a height/width ratio between 7 to 50.

18. The mount pad according to claim 4, wherein the monolithic structure is devoid of any cuts.

19. The mount pad according to claim 6, wherein the monolithic structure is devoid of any cuts.

20. The mount pad according to claim 2, wherein a material of which the monolithic structure is made is selected from the group consisting of an iron-nickel alloy and a titanium alloy.

* * * * *